United States Patent [19]

Green et al.

[11] 4,146,925

[45] Mar. 27, 1979

[54] GRAPHICS GENERATOR

[75] Inventors: Paul F. Green; Barry B. Mead, both of Clearwater, Fla.

[73] Assignee: Smiths Industries, Inc., Clearwater, Fla.

[21] Appl. No.: 821,936

[22] Filed: Aug. 4, 1977

[51] Int. Cl.[2] .................................... G06F 3/14

[52] U.S. Cl. .................................... 364/521; 340/706; 340/741

[58] Field of Search ............... 364/607, 521, 855, 518; 340/324 A; 315/364, 365, 30

[56] References Cited

U.S. PATENT DOCUMENTS

| | | | |
|---|---|---|---|
| 3,735,389 | 5/1973 | Tarczy-Hornoch | 340/324 A |
| 3,775,760 | 11/1973 | Strathman | 340/324 A |
| 3,789,200 | 1/1974 | Childress et al. | 364/521 |
| 3,809,868 | 5/1974 | Villalobos et al. | 364/521 X |
| 3,946,365 | 3/1976 | Bantner | 340/324 A X |
| 4,023,027 | 5/1977 | Strathman et al. | 340/324 A X |

*Primary Examiner*—Joseph F. Ruggiero
*Attorney, Agent, or Firm*—Pollock, Vande Sande & Priddy

[57] ABSTRACT

A graphics generator responds to signals defining a pattern to be displayed. The pattern comprises a plurality of pattern segments each of which may be a vector, conic or alpha numeric character. The graphics generator produces digital signals which are capable of driving a display through an A/D converter to produce a visual representation of the desired pattern segment. The pattern segment is broken up into a plurality of strokes of constant length regardless of orientation. Chaining the strokes on the display thus produces the desired pattern. An input signal defining a vector defines both the length and the orientation of the vector and these quantities are stored in length and orientation registers, respectively. The orientation signal is employed as an address into a sine/cos memory to derive stroke components in an orthogonal coordinate system which are then added to a beginning position of the stroke to produce the stroke end point. At the same time, a counter containing a quantity representative of the length of the desired vector is decremented. Repeating this process produces a series of digital signals representing strokes of constant length which can drive a display to produce the desired vector. Conics are produced in much the same manner except that the orientation register is incremented by a predetermined quantity for each cycle (or once in a determined number of cycles) thereby producing strokes whose orientation changes at a constant rate. Characters can be written at any desired orientation, by accessing a character definition memory storing signals representative of a plurality of pattern segments defining the particular character.

17 Claims, 14 Drawing Figures

FIG 1
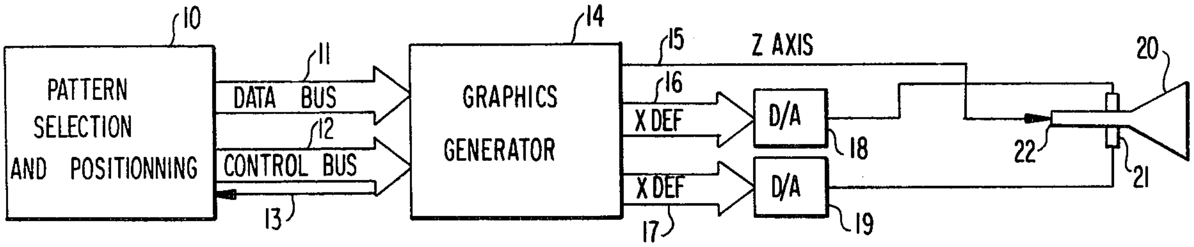
FIG 2A
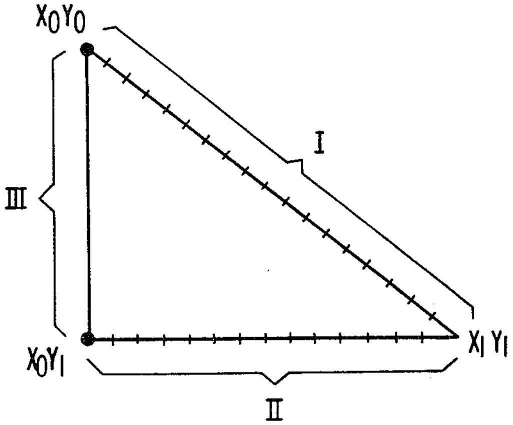
FIG 2C
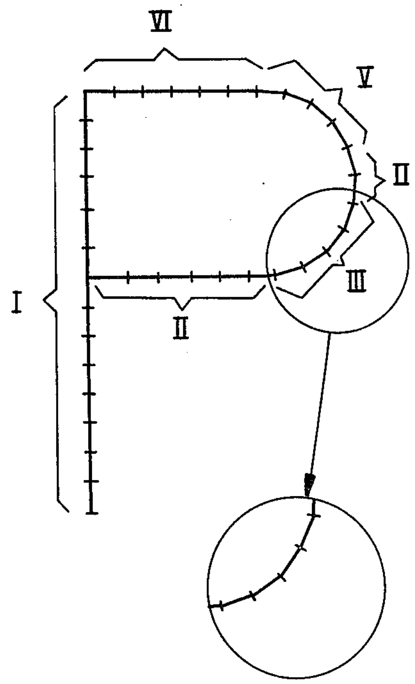
FIG 2B
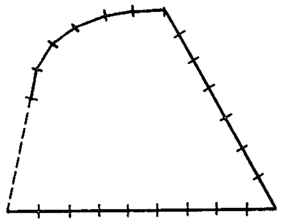
FIG 2D

GRAPHICS GENERATOR

FIELD OF THE INVENTION

The present invention relates to apparatus for the display of patterns, and more particularly, relates to apparatus which can be driven by digital signals provided by a computer or the like, and which produces signals capable of driving a display such as a cathode ray tube.

BACKGROUND OF THE INVENTION

For many years the art has been aware of the benefits to be gained by driving a display such as a cathode ray tube with signals derived from a computer, such as a digital computer. The computer can be arranged to provide signals in a variety of formats depending upon the particular application, and usually some type of graphics generator is employed so as to produce signals of the type required to drive the display. In the case of a cathode ray tube, for example, the signals required to drive the display include beam deflection signals and unblanking signals. Deflection signals determine beam position in, for example, an x-y or an r-$\theta$ coordinate system. The pattern defining signals derived from the computer can be in a variety of forms.

At one extreme, the signals provided by the computer can actually define the movement pattern of the beam and may be connected directly, or through a digital/analog converter to the beam deflection system. Such an arrangement, however, can needlessly tie up a computer in generating beam position signals preventing the computer from doing more useful operations. It has therefore been appreciated that a simpler device can be driven by coded signals and the simpler device, i.e., the graphics generator, can actually produce the beam position signals necessary to produce the pattern or pattern segment defined by the input coded signal. For example, a vector can be defined by three quantities, a beginning point, a length and an orientation or angle and a graphics generator can be employed to convert these three quantities into beam position signals to cause the beam to traverse the desired pattern. In addition, an unblanking signal is required to illuminate the vector or line by unblanking the cathode of the cathode ray tube at the time the beam reaches the initial position, maintaining the cathode in an unblanked condition during the time the beam traverses the desired vector, and then blanking the cathode after the beam has passed the end of the vector.

Graphics generators capable of substantially performing the foregoing functions are well known in the art. With the advent of such graphics generators, it became apparent that special attention was required to control the writing speed of the beam at a constant rate, otherwise, pattern segments written at a slow rate would be over-illuminated, and other pattern segments written at a faster rate would be under-illuminated.

The desired goal of constant writing speed can be achieved, in a beam deflection system operating in an x-y coordinate arrangement, by controlling the incremental beam displacement per unit time such that the square root of the sum of the resolved incremental component displacements squared is equal to a constant. Such an arrangement is shown, for example, in U.S. Pat. Nos. 3,576,461; 3,725,723; 3,761,765; 3,869,085, and 3,818,475. However, in each of these systems, the resolved incremental offsets are derived from the computer, and thus to at least this extent, the computer is tied up and prevented from performing other tasks.

It has also been recognized in the prior art that the computer can be freed from unnecessary operations if predetermined patterns are defined by selected codes, and a graphics generator employed to generate beam position and unblanking signals responsive to the codes to produce the desired pattern. For example, alpha numeric patterns can readily be defined by the computer in shorthand (or code) form if the graphics generator can be provided to respond to the shorthand (or code) form to produce the necessary beam deflection and unblanking signals to produce the pattern. Such a device is disclosed, for example, in U.S. Pat. No. 3,952,297. As disclosed in that patent, a character code selects a memory location in which is stored data definitive of a series of micro strokes which can be employed to produce the desired character on a CRT or the like. While the patent alleges that it discloses an arrangement having minimal data storage requirements, nevertheless, it requires storage of a plurality of micro strokes, that is, the x and y coordinates of the end of each micro stroke for each character. In addition, it is not at all apparent that the apparatus disclosed can be employed to generate anything but the preselected characters whose definition is stored. Furthermore, since the storage includes the resolved increments in x and y directions, it is not seen that the arrangement is adaptable to provide the character at any selected orientation.

It is therefore one object of the present invention to provide a graphics generator which is capable of accepting coded signals from, for example, a digital computer definitive of a desired pattern, in which each of the signals represents a different pattern segment, and which is capable of operating on those pattern segment defining signals to produce digital signals for controlling beam deflection and unblanking of a display such as a cathode ray tube display to produce the desired pattern segment. It is another object of the present invention to provide apparatus such as apparatus of the type mentioned in which the beam deflection varies at a constant rate so as to produce constant brightness displays, regardless of the pattern segment, the size thereof or its orientation.

It is yet another object of the present invention to provide a graphics generator which is capable of producing signals for deflecting the beam of a display such as a cathode ray tube to display patterns comprising pattern segments in the form of vectors, conics or characters. It is another object of the invention to provide a graphics generator which includes a storage device defining each character to be displayed which further includes further apparatus so that such character can be displayed at any desired position or orientation in the display.

SUMMARY OF THE INVENTION

These and other objects of the invention are met by providing a graphics generator responsive to pattern segment defining signals in which each pattern segment comprises a vector, conic or character. A vector defining signal specifies at least vector length and orientation and the apparatus includes a counter for storing the vector length and a register for storing orientation. Each vector is broken up by the generator into a series of strokes of uniform length regardless of orientation. To effect this, the vector orientation is employed as an address into a memory to provide resolved components of a unit length stroke at the proper orientation, the respective outputs of the memory are coupled to adders where the components are added to the previous beam position to produce a final beam position signal for the stroke. At the same time, the counter storing a quantity related to vector length is decremented once for each stroke produced. When the counter is decremented to zero, a plurality of strokes have been produced at the proper orientation to represent the desired vector. Conics are achieved in much the same fashion, except that the orientation address is varied at a constant rate, such as, for example, by adding a constant to the orientation register after each memory reference.

The apparatus for displaying characters employs the previously discussed apparatus and, in addition, a character definition storage device which defines a plurality of vectors making up the desired character.

By initializing the orientation register, the desired pattern segment, whether it be vector, conic or character, can be written at the desired orientation. By initializing output registers which receive the adder outputs, the pattern segment is written beginning at the starting point represented by the initialized values of the output registers.

Border control apparatus and speed control apparatus are also included so that the pattern display is written only in predetermined areas. While the foregoing provides for constant writing speed, throughout the display, the writing speed may be selected as one of a number of available writing speeds.

BRIEF DESCRIPTION OF THE DRAWINGS

A preferred embodiment of the invention will now be described in further detail in the remaining portion of this specification when taken in conjunction with the attached drawings in which identical reference characters identify identical apparatus and in which:

FIG. 1 is a block diagram of a typical manner in which the graphics generator of the invention finds particular utility;

FIGS. 2A through 2D are useful in explaining how the output signals of the graphics generator can be employed to produce displays of various kinds;

DETAILED DESCRIPTION OF A PREFERRED EMBODIMENT

Figure 3:
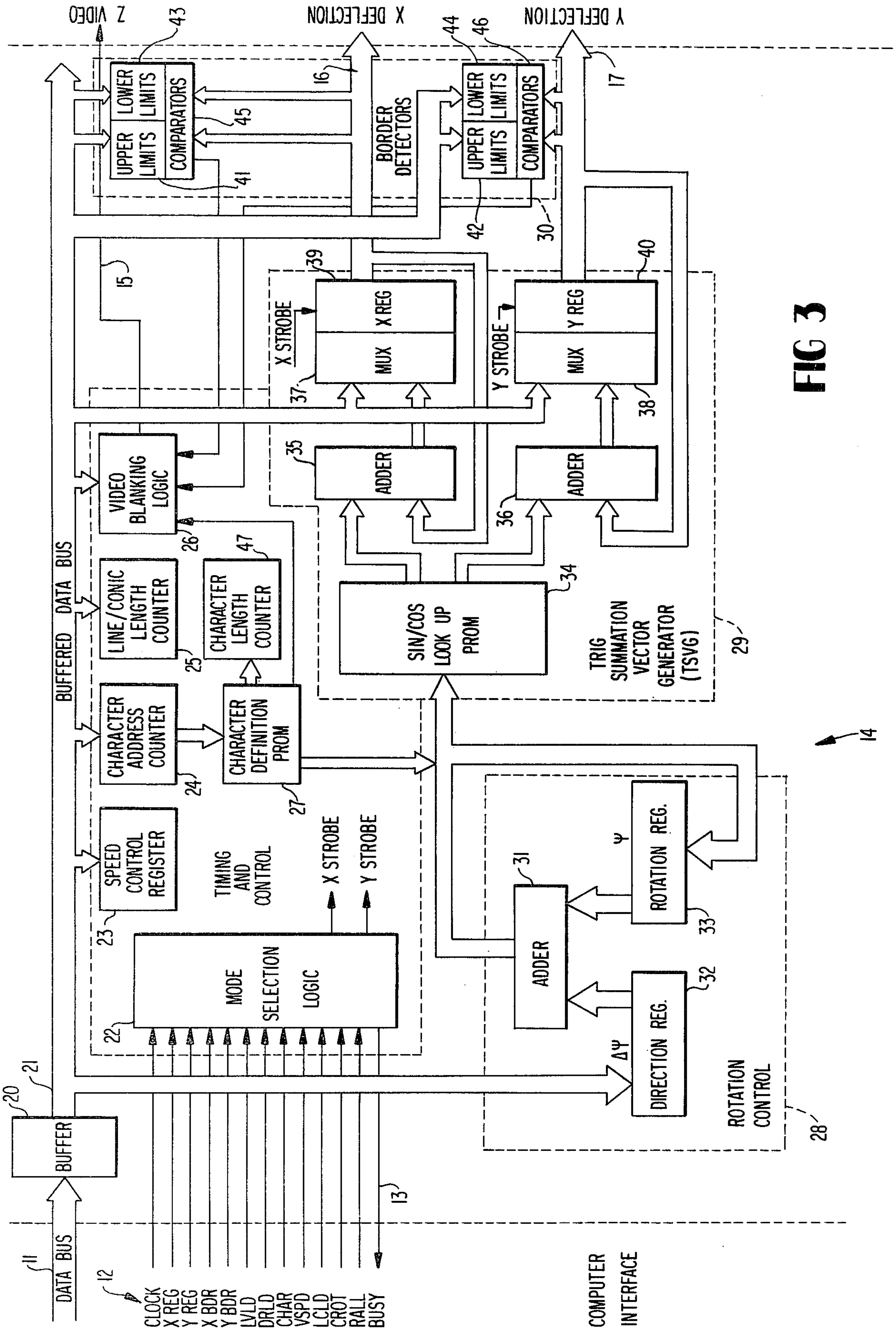
FIG. 3 is a block diagram of a preferred embodiment of a graphics generator in accordance with the principles of the invention.

As shown in FIG. 1, a pattern selection and positioning device 10 is coupled to a graphics generator 14 via a data bus 11 and a control bus 12. The graphics generator 14 has three output lines, one for Z axis control, 15; one for X deflection control, 16 and one for Y deflection control, 17. The latter two lines are provided, respectively, to digital to analog converters 18 and 19, the outputs of which are connected to the deflection system 21 of a conventional display such as a CRT 20. The Z axis line 15 provided by the graphics generator 14 is coupled to the control grid 22 of the conventional display 20.

The pattern selection and positioning device 10 can actually comprise a wide variety of apparatus, although typically the functions required to be performed by this apparatus will be performed by a conventional digital computer. The graphics generator 14 is capable of responding to selected sets of signals on data bus 11, when provided in association with one or more control signals on control bus 12, in order to produce a pattern on a conventional display 20 in accordance with the signals provided to it. The patterns which are capable of being displayed are broken up into one or more pattern segments and signals defining each pattern segment, separately, are provided to the graphics generator 14. Pattern segments that can be displayed include a line, the length of which is variable from some minimum length which will be specified below, to a line extending across the full display area at an angle which can be parallel to the horizontal or vertical coordinate, or any angle in between. In specifying a pattern segment which comprises a line, normally only the line length, and direction of the line are specified. The beginning point of the line is usually the end point of a previously written segment, although, if not, the generator 14 can be initialized to begin writing at any selected point.

Another pattern segment which can be employed is a conic pattern segment, and specification of the conic pattern segment normally requires specification of a circumferential length and a quantity related to the radius of curvature.

The third and final type of pattern segment which can be displayed is a character within a repertoire of characters which are internally defined in the graphics generator 14. In addition to specifying the particular character in the repertoire that is to be displayed, angular positioning of the character may be specified.

A particular pattern can be made up of any combination of such pattern segments.

In order to display any one of the aforementioned pattern segments, the graphics generator produces an initial deflection signal so as to position the display at the starting point for the pattern segment. For example, in a display based on an X/Y coordinate system, such as the one which will be disclosed in connection with the preferred embodiment, the initial deflection signal includes an X and Y deflection component. Typically, one segment will begin at the end of a previous segment so initializing may only be required once per pattern display. In a timed sequence, thereafter, the deflection signals (both X and Y) are altered by incrementing each deflection signal (by incrementing, we intend to include either positive or negative incrementing) such that the result of incrementing the X and Y deflection signals produces an overall deflection signal which varies at a constant rate. Since the relationship between the components of the incremental deflection signal depends upon the direction, the components of the incremental deflection need not (and usually do not) vary at a constant rate.

More particularly, the graphics generator produces deflection signals which produce, on the display, the desired pattern segment which is comprised of a series of short straight lines or strokes which approximate the desired pattern segments. Each stroke, regardless of direction, is of unit length and since the number of strokes per unit time is constant, the overall writing speed of the display is constant.

The foregoing is achieved by producing, at the output of the graphics generator 14, X deflection and Y deflection signals 16 and 17, respectively, in timed succession, which, when converted to analog form and applied to the display 20, will produce the desired pattern segment. Each pattern segment is in turn composed of a plurality of strokes, each stroke of unit length and of a direction determined by the particular pattern being displayed.

FIG. 2A illustrates a pattern which can be displayed which is composed of three pattern segments identified as I, II and III. Each of the pattern segments in this example is composed of a straight line. The pattern can be displayed by initializing at the point $X_0$ $Y_0$, specifying the direction of the line from that point to the desired end point $X_1$ $Y_1$, and the length of the line. In order to produce the rest of the pattern, the length of the line II is specified as well as the direction from $X_1$ $Y_1$ to $X_0$ $Y_1$. Likewise, to produce the remaining portion of the pattern specification of the pattern segment III comprising the length of this line as well as its direction, from $X_0$ to $Y_1$ to $X_0$ $Y_0$ is required.

As will be disclosed in more detail in the portion of the specification which follows, the pattern segment I is produced by providing incremental deflection signals to deflect the beam across the face of the display to trace out the pattern segment I. This is accomplished by providing a timed succession of deflection signals, or varying the deflection signal as a function of time, each change in the deflection signal produces a stroke of unit length and since the rate of changes is constant, so is writing speed. The direction of the stroke is equal to the direction of the line. The separate strokes are illustrated in FIG. 2A as lying between the short strokes perpendicular to the line I. Those skilled in the art will understand, of course, that the drawing of FIG. 2A is not to scale and that the actual stroke length produced at the display 20 can, and usually will, be so small as not to be separately identified. The stroke length limits the shortest line that can be displayed, although practically such a short line would not be used.

FIG. 2B is another example of a plurality of pattern segments which can be displayed. FIG. 2B differs from FIG. 2A in that at least one of the pattern segments included is a conic or arcuate pattern segment. This is generated by a series of linear strokes of equal length, but of varying angular orientation so as to approximate the desired curve. A portion of the pattern in FIG. 2B is shown dotted to indicate that open patterns can be generated, i.e., by blanking the beam over the open portion of the pattern.

FIG. 2C is similar to FIG. 2B in that the pattern displayed there includes both straight line and arcuate segments made up, as in the two previous examples of a series of equal length strokes. However, the pattern of FIG. 2C is different from the other two patterns in that it represents the letter P and if this is within the repertoire of characters of the graphics generator, it can be generated by merely identifying the character, giving a starting location for the character and an angular orientation, rather than identifying the six different pattern segments which make up the pattern.

FIG. 2D shows, in an enlarged view, how the arcuate portion III is generated by the display.

The graphics generator 14 is illustrated in block diagram form in FIG. 3. FIG. 3 shows the data bus 11 as being coupled to a buffer 20.

Also coupled to the graphics generator 14 is the control bus 12, comprising 12 separate conductors, each coupled to a mode selection logic 22 as well as a thirteenth conductor providing a control signal from the graphics generator 14 to the pattern selection and positioning device 10.

The buffered data bus 21 at the output of buffer 20 carries, at different points in time, representations for different data items used in creating the pattern segment. This data is coupled under the control of mode selection logic 22, for the purpose of initializing the graphics generator 14 to create the timed sequence of deflection signals necessary to create the desired pattern segments. More particularly, buffered data bus 21 is coupled to a speed control register 23, character address counter 24, line/conic length counter 25, video blanking logic 26, multiplexer 37, multiplexer 38, registers 41–44 associated with border detectors 30 and a direction register 32 associated with a rotation control 28.

Before describing the manner in which the apparatus shown in FIG. 3 cooperates to produce the desired signals, a brief description of the philosophy of the operation will be provided.

The incremental change in display deflection which is produced per unit time is, as mentioned above, of predetermined and constant length. The initial position for the stroke is defined by the data existing in the X register 39 and Y register 40. The direction in which the incremental display deflection is to be provided is determined by a quantity produced by adder 31 included in a rotation control device 28. The output of adder 31 is employed as an address in sine/cosine lookup PROM 34. This programmed read only memory has a cosine output coupled to an X adder 35 and a sine output coupled to Y adder 36. The memory is arranged to store the sine and cosine trigonometric functions for all angles, i.e., 360°. PROM 34 is arranged so that the cosine output for any address selected by the output of adder 31 is 1 cosine $\theta$ (where $\theta$ represents the address) and the sine output is 1 sine $\theta$. Accordingly, incremental deflection will be of length 1, although in general, the components will be some unequal portion thereof. Thus, for every memory lookup the X and Y incremental deflection of the desired angle are provided to X means 35 and Y adder 36. Also coupled to these adders is a representation of the present display position from the X register 39 and Y register 40. The sum is, therefore, the new display deflection which differs from the previous display deflection by 1 display unit. The sum is coupled through the associated multiplexer back into the X register 39 and Y register 40.

Accordingly, to represent a line segment beginning at some initial position which is initially loaded in the X register 39 and Y register 40, the line direction is provided to the direction register 32 from the buffered data bus 21. On the first memory lookup, the components of the required incremental deflection, for this direction, are provided from the read only memory 34 to the associated adders and the result is placed in the X register 39 and Y register 40. At the same time, the line/-conic length counter, which had initially been set to represent the desired line length, is decremented by a quantity corresponding to the stroke length. After a number of cycles, equal in number to the length of the desired line expressed as a multiple of the stroke length, the line/conic length counter is decremented to zero. This terminates the display of the line segment.

Arcuate or conic segments are displayed in much the same fashion except that a quantity representing the incremental change in angle for adjacent strokes is repeatedly provided by the direction register 32 and thus, the resultant produced in adder 31 is continually changing. Accordingly, the display is not a line of unchanging direction, but is a series of strokes whose direction varies in a constant rate, related to the radius of curvature of the desired arcuate segment.

In order to display a character, character definition PROM 27 is provided which is loaded with data defining different characters that can be displayed. Each character to be displayed has a reserved area in the memory for storing data defining various segments making up the character, and for each character segment a direction and length is stored. Thus, when a particular character is selected, character address counter 24 addresses the appropriate reserved area in the memory 27 and the data defining the first character segment is read out to the character length counter 47 and the direction register. Each segment of the character is then displayed in the same fashion, until all the segments of the character have been displayed at which time an end of character signal is provided to terminate the display of the character.

Before generating a line, conic or character, registers and status bits must be initialized including the X and Y deflection registers 39 and 40, respectively, the direction register 32, the rotation register 33, speed control register 23, border limit registers 41–44, video status including the video blanking logic 26 and inclusive/occlusive bordering. Once initialized, in a line mode, all registers and status bits remain unchanged except for the X and Y deflection registers 39 and 40. In the conic mode, both the X and Y deflection registers as well as the rotation register are varied, and in the character mode, the X and Y deflection registers as well as the direction register are altered.

Figure 5:
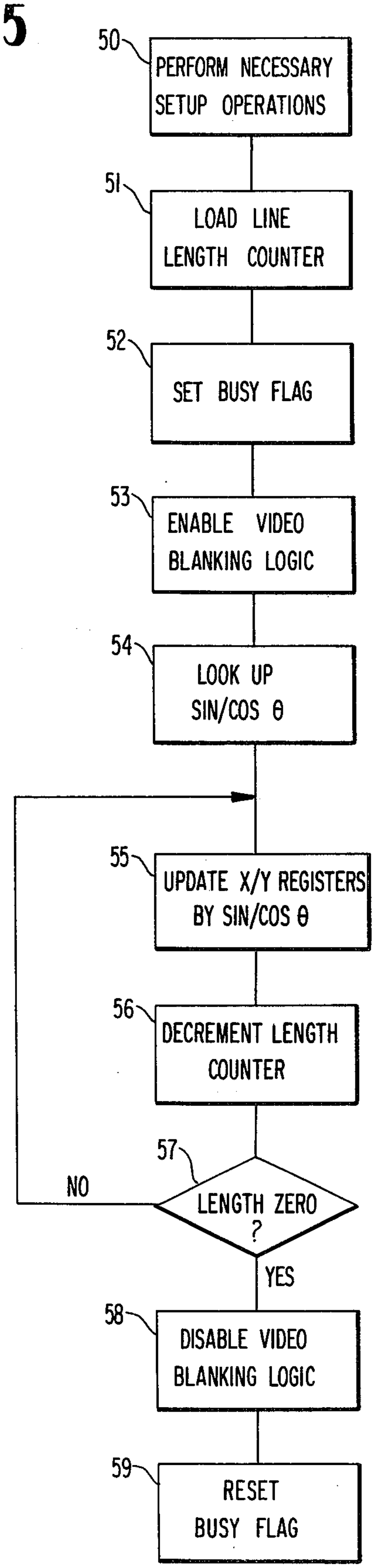

For line generation, the pattern selection and positioning device 10 provides signals to set the X and Y deflection registers representing an initial value and provides the line length L and initial value for the direction register 32. During actual line writing, the length counter is decremented and the X and Y deflection registers are strobed to produce a line starting at the initial point with the length L and an angular direction equal to the sum of the value inserted in the direction register plus any value remaining in the rotation register 33. The functional flow diagram of FIG. 5 depicts the sequential operations performed in generating a line. Step 50 performs the necessary set up operations as outlined above except for initializing the line/conic length counter 25. The line/conic length counter is initialized by energizing the control line LVLD when the buffered data bus 21 carries a representation for the length of the line. When the line/conic length counter is loaded, line generation begins. The BUSY flag is set at step 52. Step 53 enables the video, i.e., the video is unblanked. The angle, whose representation is now produced in the adder 31, is employed as an address into the memory 34 producing cosine and sine outputs to the adders 35 and 36, respectively, at function 54. These values cause the X and Y registers 39 and 40 to be updated at function 55 (in response to a strobe signal applied at each of these registers). Function 56 decrements the length counter 25. Function 57 determines if the remaining length (of the line/conic length counter) is now zero, and assuming it is not, functions 55 and 56 are performed repetitively until the length has been reduced to zero. At that time, function 58 blanks the video and function 59 resets the BUSY flag enabling the graphics generator 14 to process another pattern segment.

Figure 6:
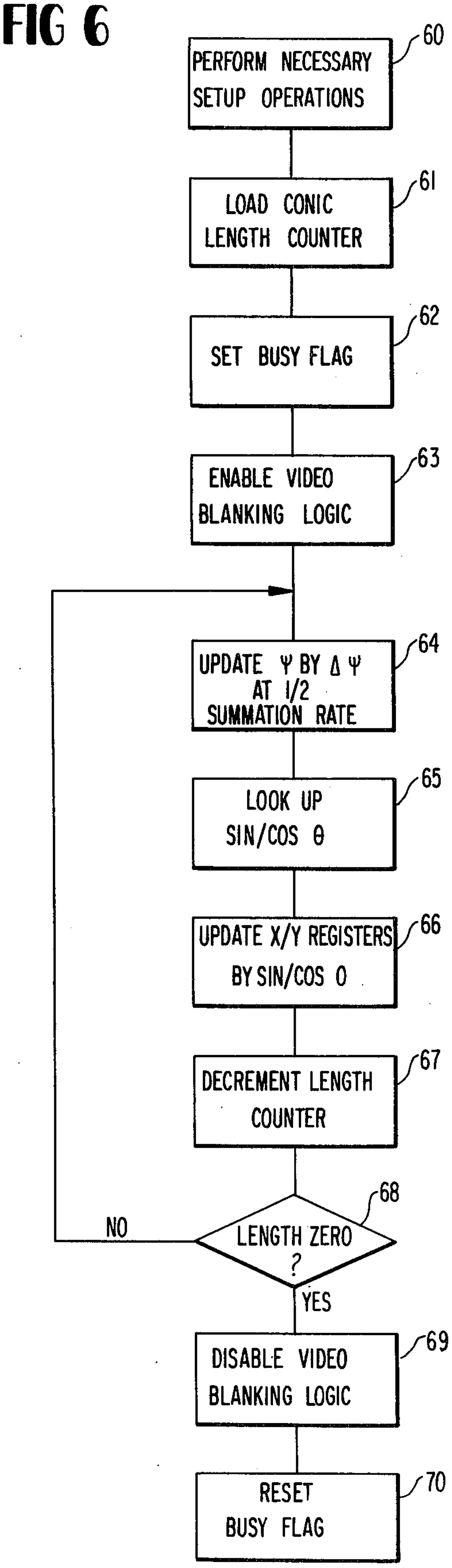

FIG. 6 is a flow diagram for generating a conic or arcuate display. The timing and control logic, to be disclosed in more detail hereinafter, activates the rotation register 33 at half the vector summation rate, that is, at half the rate at which the X and Y strobes are produced. Accordingly, constant direction change is achieved by accumulating new values in the adder 31 to thereby draw an arc or circle with circumference equal to the contents of the length counter and radius inversely proportional to the value of the quantity repetitively inserted by direction register 32. As shown in FIG. 6, the first step of this process, function 60, performs the necessary set up operations, including X and Y deflection registers 39 and 40 (if necessary) direction, rotation, speed, border limits, video status and inclusive/occlusive bordering. In this mode, the X and Y deflection registers and the rotation register continually change in value.

Function 61 loads the line/conic length counter 25 to begin the operation. Function 62 sets the BUSY flag and function 63 enables the video. Function 64 updates the adder 31 on every other cycle, for example, on a first pass in this portion of the flow diagram, the adder value is incremented. Function 65, employing the value now in adder 31, derives sine and cosine values which are summed in adders 35 and 36 at function 66. Function 67 decrements the length counter 25 and function 68 determines if the length counter has reached zero. If it has not, functions 64 through 67 may be performed again except that on even passes through function 64–67 for example, the adder is not incremented, but rather the previous value orientation is employed at function 65. In this fashion, the loop of functions 64–68 are repeated until the contents of the length counter is determined to be zero. When that occurs, function 69 disables the video and function 70 resets the BUSY flag enabling further segments to be processed.

Figure 7:
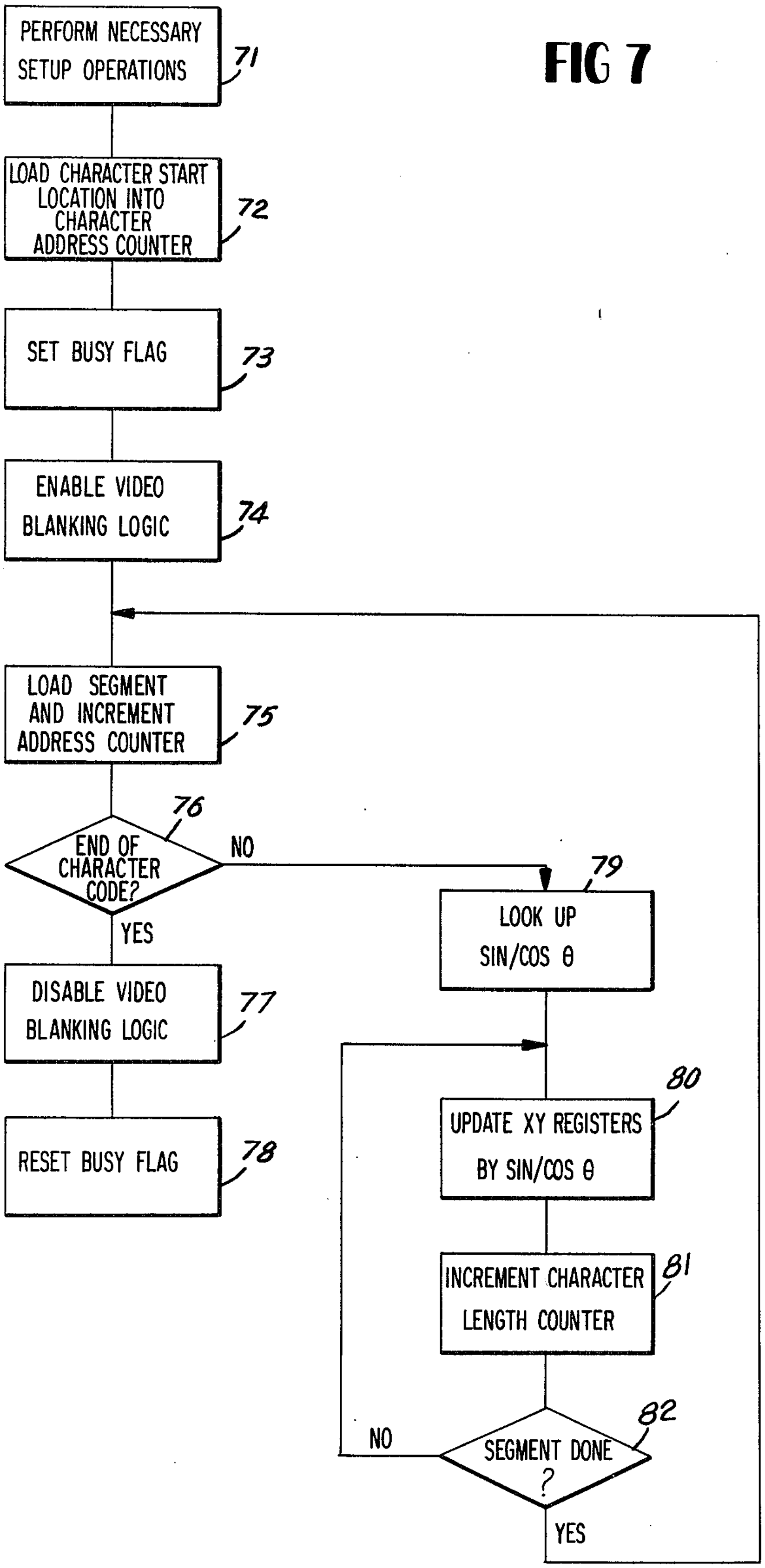

FIG. 7 is a flow diagram for the character mode. In the character mode, only the X and Y deflection registers and the direction register are changed during the writing of a single character. All other registers are initially set by function 71. Function 72 loads the character start location into the character address counter 24. Function 73 sets the BUSY flag and function 74 enables the video. In function 75, a character segment definition is read out of the character definition memory 27 and the character address is incremented. Function 76 determines if this is the end of the character code, and assuming it is not, function 79 employs the now loaded direction information with the memory 34 and, employing that data, function 80 updates the X and Y deflection registers. Function 81 increments the character length counter 47 and function 82 determines if the segment is completed. If it is not, functions 80–82 are repeated until, at some point, the segment of the character is completed. Function 75 is then performed to load a new segment. After a number of character segments have been displayed, function 76 determines that the end of character code has been read out. In that event, function 77 disables the video and function 78 resets the BUSY flag and the apparatus is enabled to process further pattern segments.

Figure 4A:
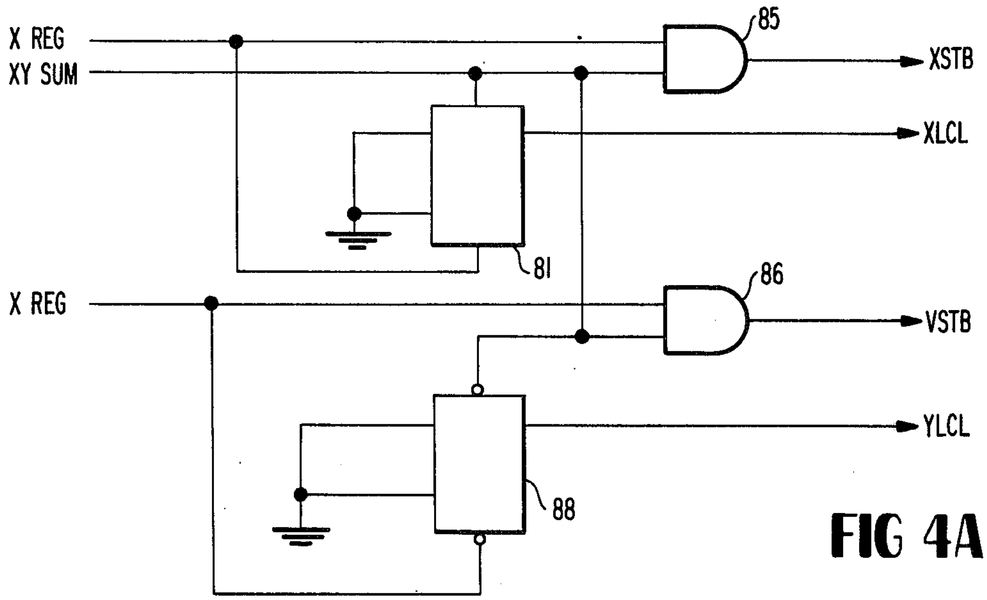
FIGS. 4A, 4B, 4C, 4D and 4E are a detailed block diagram of a preferred embodiment of the graphics generator; and, FIGS. 5, 6 and 7 are flow diagrams which illustrate typical operations performed in the preferred embodiment.
Figure 4C:
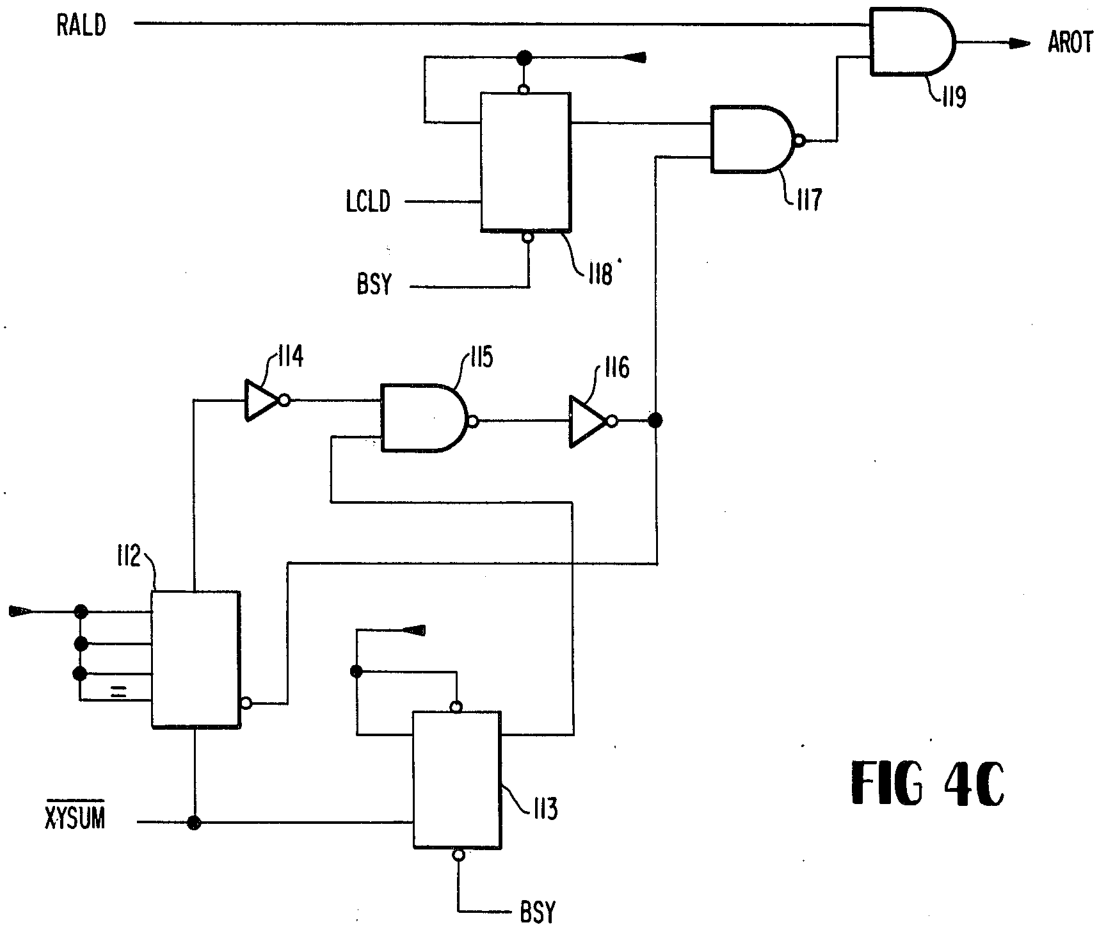
Figure 4B:
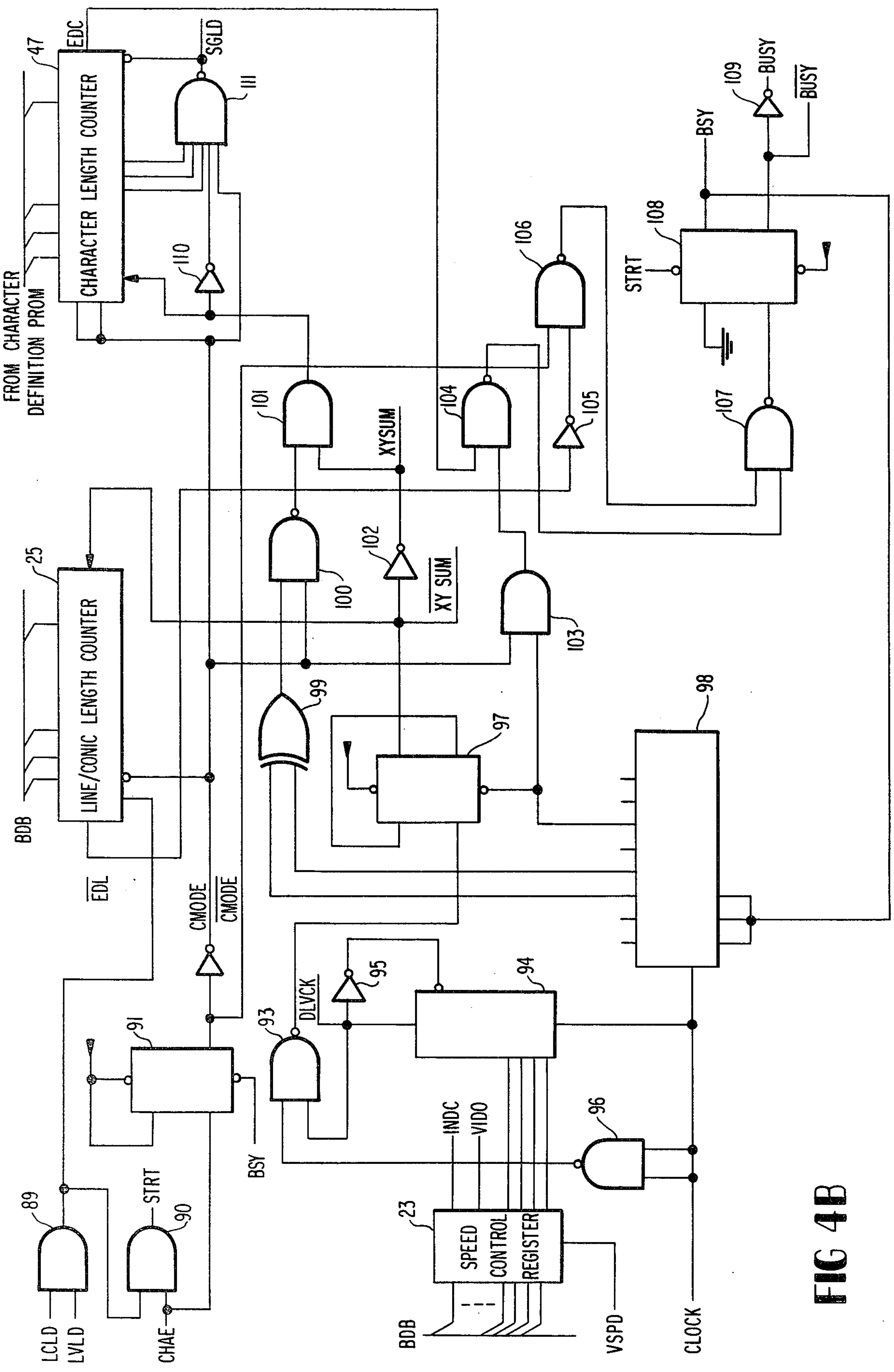

In order to describe, in more detail, the construction of the graphics generator, and in particular, the mode selection logic 22, reference is now made to FIGS. 4A through 4C which illustrate this apparatus in detailed block diagram form.

Figure 4D:
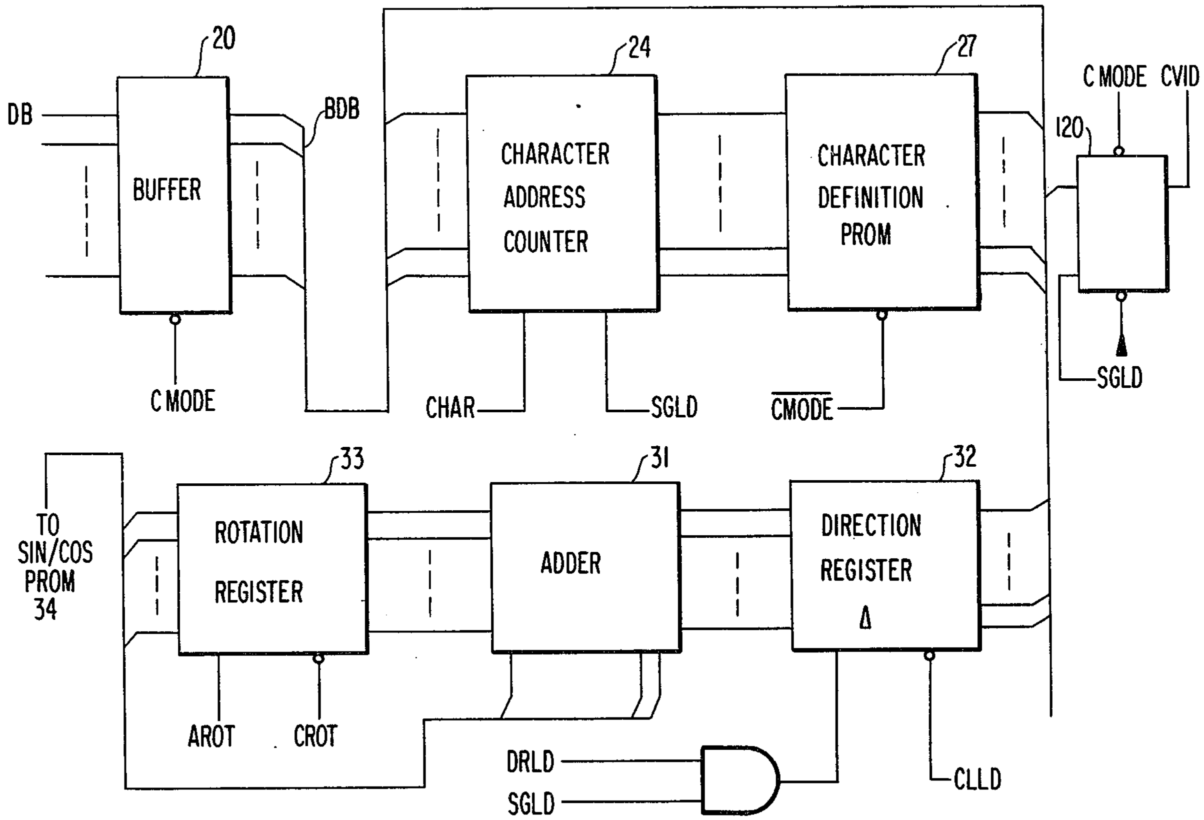
Figure 4E:
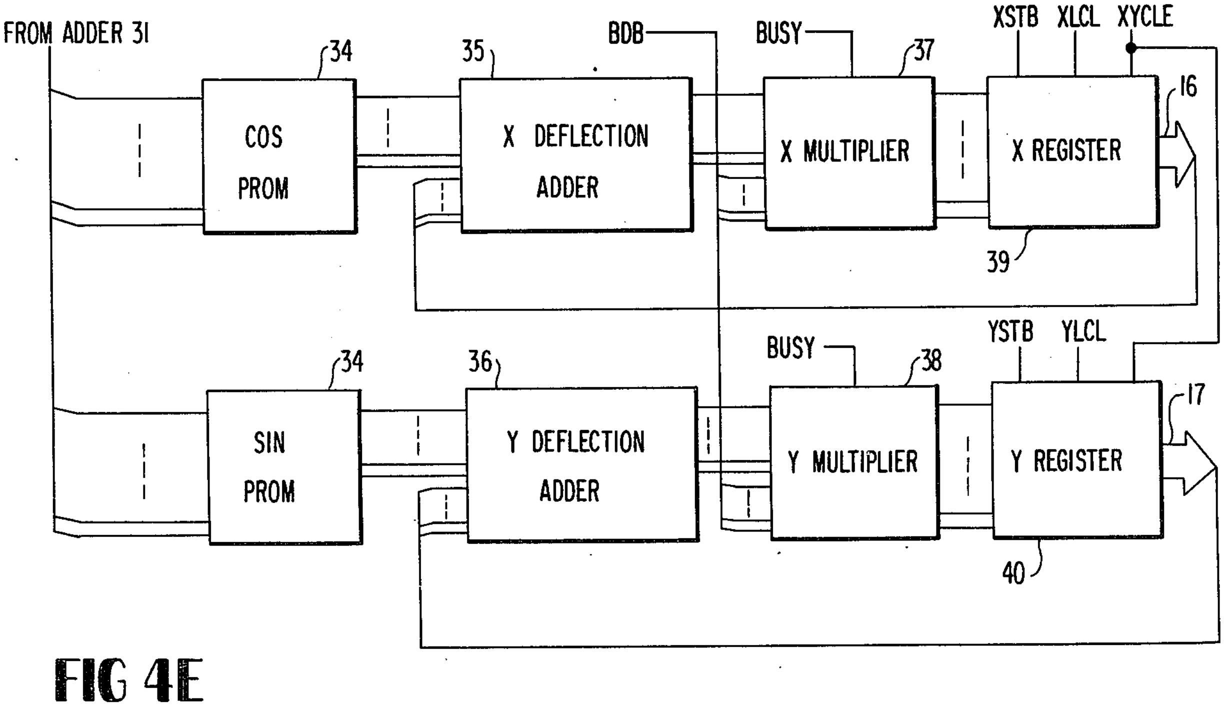

The apparatus shown in FIG. 4A is provided to produce necessary control signals for initializing the X and Y deflection registers 39 and 40 whenever required. As illustrated in FIG. 4A, the control signal XREG, is provided as one input of an AND gate 85 whose output is the X deflection register strobe (XSTB). Similarly, the control signal YREG is provided as one input of an AND gate 86 whose output is YSTB. The other input to AND gates 85 and 86 are provided by a signal XYSUM, the production of which will be discussed in more detail hereinafter. It is sufficient to note here that the signal XYSUM is a clocking signal which is periodically produced. Thus, when either the XREG or YREG is present, the corresponding strobe signal XSTB or YSTB is produced synchronous with XYSUM. FIGS. 4D and 4E are block diagrams illustrating the detailed interconnection of the major components in the graphics generator. As illustrated in FIG. 4E, the XSTB and YSTB are provided, respectively, to the X register 39 and Y register 40. When the graphics generator is not busy, (and the BUSY signal is not present) the multiplexers 37 and 38 couple the buffered data bus (hereinafter BDB), from the output of buffer 20, to the X and Y registers 39 and 40. The buffered data bus, in a preferred embodiment, for example, is 12 bits wide, and each of the X and Y registers 39 and 40 are 20 bits wide, the upper 12 bits of the X and Y registers are coupled through the multiplexer, to the BDB. Thus, for example, when the XREG is present, the XSTB produced strobes the quantity on the BDB into the upper 12 bits of X register 39. Similar results occur at the Y register when the control signal YREG is present, producing YSTB. Because the X and Y registers 39 and 40 store 20 bits, storing the 12 bit signals from the BDB may leave spurious values stored in the lower 8 bits of the registers 39 and 40. To eliminate this, the subsequent XYSUM after XSTB or YSTB is provided, respectively, to flip-flops 81 and 88, producing, respectively, XLCL and YLCL. These clearing signals are connected to the lower 8 bits of each of the X and Y registers so that, after a load operation, the registers contain only the upper 12 bits, and the lower 8 bits are cleared to zeros.

FIG. 4B illustrates, in detailed block diagram form, several other components of the mode selection logic 22. The control signal VSPD is coupled to a speed control register 23, whose data inputs are coupled to BDB. Outputs of the speed control register 23 are provided to binary counter 94 which is clocked by a signal CLOCK at, for example, an 8 mHz. rate. The CLOCK signal is coupled through a NOR gate 96 (connected as a buffer) to a NOR gate 93, another of whose inputs is provided by the output of the counter 94. The output of counter 94 is coupled through an inverter 95 to its input. The combination of the speed control register, counter 94 and its associated components, function as a software programmable rate multiplier permitting incremental vector summation rate variability. As is explained in more detail below, the rate at which XYSUM is produced depends on the contents of the speed control register 23. The output of the NAND gate 93, at a rate which is exactly twice the desired rate, is coupled to a flip-flop 97, connected as a divider. The output of flip-flop 97 is coupled to an inverter 102 the output of which is the signal XYSUM. The input to inverter 102 is also available which is the signal $\overline{\text{XYSUM}}$.

At the time VSPD is active, the BDB also carries certain control signals which are stored in the control register 23 and from there, made available to other portions of the graphics generator. One stage in the speed control register 23 is dedicated to a signal which is provided to a video blanking logic 26. In one state, the video is disabled, while in the other, the video is enabled. This is useful if, for example, the beam is to be repositioned without providing an illuminated display. Another stage in the speed control register 23 can be dedicated for border control purposes, a further discussion of which will appear hereinafter.

The presence of the control signal DRLD is a strobe to the direction register 32 allowing it to accept data on the BDB (see FIG. 4D).

The presence of the control signal CROT clears the rotation register 33 (see FIG. 4D).

The control signal RALD loads the rotation register with the sum of the quantity previously stored in the rotation register and the quantity stored in the direction register 32. The presence of the control signal RALD produces AROT by AND gate 119 (see FIG. 4C). The internally generated control signal AROT is coupled to the rotation register 33 to strobe in the contents of adder 31 (see FIG. 4D).

Thus, by providing the proper control signals and seeing that the data bus coupled to the buffer 20 simultaneously carries the appropriate signal representation, the various status registers can be initialized.

Once initialized, the graphics generator operates in one of three modes, line drawing, where a pattern segment to be displayed is a straight line; a conic mode wherein the pattern segment to be produced is an arcuate segment or section of a circle; or a character mode wherein the pattern segment to be displayed is a character included in a repertoire of characters of the graphics generator. Creation of the display is initiated by the presence of one of the three control signals LVLD for the line mode, LCLD for the conic mode, and CHAR for the character mode. In either of the first two modes, when the appropriate control signal is active, the buffer 20 is provided with a bit pattern representing the length of the line or conic to be produced, and this bit pattern is clocked into the length counter 25 from the BDB in the presence of an output from gate 89. In the character mode, on the other hand, the bit pattern on the BDB when the control signal CHAR is present represents the address of the first segment of the character stored in the character definition memory 27. That memory is addressed by a counter 24 and thus, in the presence of CHAR, the bit pattern on the BDB is clocked into the counter 24.

The control signals are active when they are at a low level i.e., all control lines are normally high, and have a low transition when active.

Regardless of which of the three control signals are present, gate 90 produces the signal STRT to signal initiation of the pattern generating process. The control signal STRT is coupled to a flip-flop 108 which is set thereby to produce the signal BSY. The $\overline{Q}$ output of flip-flop 108, which goes low when STRT is produced, is the $\overline{\text{BUSY}}$ signal. That signal is coupled to an inverter 109 whose output is the signal BUSY. As shown in FIG. 3, this signal is coupled back, via line 13, to the data source to indicate that the graphics generator 14 is operating on the information provided to it.

Depending upon whether or not the control signal CHAR is present, when the signal BSY is produced, flip-flop 91 may be in one of two conditions. If it is in the character mode, then the $\overline{Q}$ output of flip-flop 91 is low; this is the signal $\overline{CMODE}$. That signal is provided as an input to inverter 92 whose output is the signal CMODE. When CMODE is high, the counter 25 is inhibited from responding to the data on BDB. Likewise, when $\overline{CMODE}$ is high, the character definition memory 27 is inhibited from providing an output to the BDB. On the other hand, when $\overline{CMODE}$ is high, it provides a strobing input to the character length counter 47 so that it can respond to outputs from the character definition memory 27.

With the X and Y registers 39 and 40 initialized to the starting point of a pattern segment, for example, a line, the direction register 32 contains information defining the direction which the line will take and the speed register 23 contains a quantity defining the writing speed with which the display will be created. A subsequent LVLD control signal causes the length counter 25 to be loaded (from the BDB) with the quantity representing the length of the desired line comprising the pattern segment to be displayed. Production of the signal BUSY switches the multiplexers 37 and 38 so that now the registers 39 and 40 are responsive to the adders 35 and 36, rather than to data on the BDB. Assuming that the rotation register 33 had been cleared, in some previous operation, the output of adder 31 is merely the quantity previously maintained in the direction register 32. The output of the adder 31 is coupled to the sine/cosine memory 34 to provide it with addressing information. Thus, the output of the memories 34 provides inputs to the x adder 35 and the y adder 36. Other inputs to these adders are provided from the X register 39 and Y register 40. Accordingly, as soon as line direction information is contained in the direction register 32, the output of the adders 35 and 36 represent the summation of the starting location with the increment provided by the output of the memory 34. As explained above, the cosine portion of the memory 34 provides an output which is related to one deflection unit times the cosine of the angle which is represented by the output of adder 31. Similarly, the sine portion of the memory 34 provides an output which is equal to one deflection unit times the sine of the angle which is represented by the output of the adder 31. Thus, the incrementation in the first, and succeeding cycles from the previously attained value in the x and y deflection registers, has a resultant equal to one deflection unit, regardless of the angle at which the increment is provided. Accordingly, writing speed is identical for all directions. The new value for the x and y adder 36 is, up to this point, however, not yet effective, since it is the value contained in the X register 39 and Y register 40 which is coupled to the display.

As shown in FIG. 4B, the quantity XYSUM as well as the quantity $\overline{XYSUM}$ are produced at a rate determined jointly by the clock as well as the quantity stored in the speed control register 23. The quantity $\overline{XYSUM}$ is coupled as an input to the length counter 25, and is employed to decrement the quantity in that counter each time the signal $\overline{XYSUM}$ is active. For each instance in which the quantity in the length counter is decremented, the next cycle of that signal, when the quantity XYSUM is active results in producing the signals XSTB and YSTB at gates 85 and 86 (see FIG. 4A). These signals are effective, at the registers 39 and 40 to strobe in the new values provided by the adders 35 and 36 through the multiplexers 37 and 38. Therefore, in each cycle of the signal XYSUM a new quantity is strobed in the registers 39 and 40 and the length counter is decremented one unit.

This operation is repeated and as the quantities in the X and Y registers 39 and 40 are incremented, the display produces the desired pattern segment. When the length counter 25 has been decremented to zero, the signal $\overline{EOL}$ goes low, producing a high output of inverter 105, which is coupled as one input to a NAND gate 106. The other input to this gate is the signal $\overline{CMODE}$ which, since the graphics generator is in the line mode, is also high. The resulting low going output of gate 106 is provided as an input to gate 107 which is coupled to the flip-flop 108 to reset the same. This removes the signal BUSY and signals that the graphics generator is available for further pattern segment display.

In the conic mode, the operation is substantially the same except for one significant difference. To produce a conic, the incremental pattern segments are drawn on an angle which varies at a predetermined rate, related to the radius of curvature of the conic being drawn. To effect this operation, the initial angle at which the first incremental vector is drawn, is broken down into a base quantity, which is stored in the rotation register 33 and an incremental quantity which is stored in the direction register 32. This is effected, by first storing the base quantity in the direction register 32, via use of the control signal DRLD. Next, employing the control signal RALD, the quantity initially stored in the direction register 32 is added to the quantity stored in the rotation register 33 and upon production of the control signal RALD, the apparatus of FIG. 4C produces the control signal AROT to store the sum in the rotation register 33. The control signal DRLD is again produced at a time when the BDB has the incremental quantity to store this quantity in the direction register 32. With the registers thus initialized, the length of the conic to be created is clocked into the length counter 25 by use of the control signal LCLD. In much the same manner as previously explained, the signal STRT is produced (see gates 89 and 90, FIG. 4B) to condition flip-flop 108 to produce the BUSY signal with the previously noted effects. That is, more particularly, the display is created starting at the position defined by the values initially stored in the X and Y registers 39 and 40. When XYSUM is produced, updated values for the x and y deflection registers are strobed therein by the signals XSTB and YSTB, and a length counter 25 is decremented. Referring now to FIG. 4C, however, the flip-flops 118 and 113, counter 112, inverters 114 and 116, gates 115 and 117 and 119, result in the signal AROT being produced on every other cycle of the signal XYSUM. Therefore, for example, on the second cycle of the XYSUM signal, AROT is produced. This has the effect, on rotation register 33, of strobing in the result provided by the adder 31. This is a new quantity, which is a sum of the quantity previously stored in the rotation register and the quantity stored in the direction register 32. Note, however, that the quantity stored in the direction register 32 remains unchanged. Thus, the sine/cosine memory 34 is addressed by a new quantity.

As shown in FIG. 4C the control signal RALD is coupled as one input to a gate 119, the output of which is AROT. The other input to gate 119 is the output of NAND gate 117. One input to NAND gate 117 is the Q output of a flip-flop 118 which is reset by LCLD. The other input to gate 117 is from an inverter 116 which is driven by NAND gate 115, one of whose inputs if the Q output of flip-flop 113, which is reset by $\overline{\text{XYSUM}}$. The other input is provided by inverter 114 driven by counter 112 which is clocked by $\overline{\text{XYSUM}}$, and reset by the output of inverter 116.

The low input to gate 117, from flip-flop 118, in all but the conic mode, insures a high input to gate 119 from gate 117 partially enabling that gate so that RALD transition, when it occurs, produces AROT. In the conic mode the output of flip-flop 118 is high, allowing the clocking signal $\overline{\text{XYSUM}}$, divided by flip-flop 113, to regularly produce AROT.

This operation of incrementing the angle at which the individual strokes are drawn, continues at the same rate, i.e., at half the rate at which the stroke is drawn, resulting in every other stroke changing direction by the amount of the quantity stored in the direction register 32. The result of a series of such strokes at a constantly varying angle is or approaches an arc, which is, of course, the desired result. The operation terminates when the length counter 25 is decremented to zero, much in the manner previously referred to.

In the character mode, the control signal CHAR, applied to gate 90, produces the STRT control signal which results in production of the signal BUSY. In this mode, however, flip-flop 91 is in the state opposite to the state it is in in the line or conic modes, and thus, the signal CMODE is high, preventing length counter 25 from responding to the data on BDB or from responding to the $\overline{\text{XYSUM}}$. As a result, the signal $\overline{\text{EOL}}$ remains high, and inverter 105 and gate 106 is disabled from terminating operation.

The character defining code is transferred by buffer 20 and is employed, via the BDB, as an input to the address counter 24 in the presence of the control signal CHAR. Thereafter, the high CMODE prevents the buffer 20 from responding to any variation in its input.

The character definition PROM 27 is word organized and may store one or more than one word for each character in the repertoire. Each word defines a segment of the character, that is, more particularly, a length, blanking and direction. The length information is coupled via the memory 27 to a character length counter 47, and the direction is coupled via the BDB to the direction register 32. The blanking data is coupled to flip-flop 120 and produces CVID which determines blanking status for the segment. The control signal CLLD is used to clear the direction register prior to character generation.

Once the character length counter 47 is loaded and the direction register 32 is initialized, operation occurs much in the same manner as for displaying a line segment. That is, on every production of XYSUM a new value is clocked into the X and Y registers 39 and 40 in accordance with the direction contained in the direction register 32. With CMODE high, when XYSUM goes high, gates 99–101 produce a transition which is coupled to the character length counter 47 to decrement the count contained therein. NAND gate 111 is connected to the character length counter 47 as a decoder. When a quantity stored in the character length counter 47 has been decremented to zero, gate 111 produces an SGLD signal which is coupled to the character length counter 47 for reasons which will appear hereinafter. The signal is also coupled to the new character address counter 24 to increment the same, the new address thereby supplied to the character definition memory 27 produces a new value for the character length counter which is strobed in by SGLD signal. Similar action occurs at the direction register 32 wherein the new direction is strobed in. Accordingly, further strokes are displayed in accordance with the new direction again until the character length counter 47 is decremented to zero. After one or more times during which the character length counter is decremented to zero, it will read and end of character code from the memory 27. This will be recognized by the character length counter 47 and will produce a transition at gate 104. This, coupled with the proper output from gate 103, which depends upon the condition of a counter 98, as well as the CMODE being high, produces an input to NAND gate 107 to reset the flip-flop 108 terminating the operation of displaying the character. By initializing the X and Y registers 39 and 40, prior to addressing the character definition memory 27, any character in the machine's repertoire can be displayed at any location on the display. Furthermore, while the directions associated with character segments included in the repertoire are defined for the character in a reference position, the character may actually be displayed rotated from the reference position by any desired amount. This can be accomplished by merely initialing the rotation register 33 prior to addressing the character definition memory 27. Since the direction information, used for addressing the memory 34 is the sum of quantities stored in direction and rotation memories, any quantity stored in rotation register 33 will result in equivalent rotation for each character segment.

In one embodiment in which the BDB was a 12 bit bus, the memory 34 provided a 10 bit output and the adders produced 20 bit outputs. The registers 39 and 40, each 20 bits wide, are divided into two fields, the ten most significant bits represent units of incremental deflection and the 10 least significant bits represent fractional deflection units. The output of the sine/cosine memory 34 is a 10 bit sine filled fractional parallel field where the maximum positive number is 00000000001111111111 and the maximum negative number is 11111111110000000000.

FIG. 3 indicates, in block diagram form, border control. More particularly, right and left, upper and lower limits are provided to registers associated with the x deflection and y deflection value. Comparators are provided to determine for each deflection whether it be x or y, whether the deflection is within or outside of the limits imposed by the quantity stored in the register. In inclusive bordering, the video is unblanked only if the deflection is within the border limits. In occlusive bordering the reverse is true. Inclusive or occlusive bordering is determinined by a dedicated bit in the speed control register 23 which is stored in response to the VSPD control signal. Further details about the bordering control are not believed necessary as, with the foregoing explanation, those skilled in the art can duplicate the same.

For purposes of synchronizing the A/D converters, the XYSUM or equivalent signal can be used to clock the A/D converter track and hold circuitry.

The multiplexers 37 and 38 are 12 bits wide so that the most significant 12 bits from adders 35 and 36 are coupled to output registers 39 and 40 through the associated multiplexer. The least significant 8 bits from the adders are directly coupled to the associated output register.

What is claimed is:

1. A graphics generator for driving a display in response to plural groups of pattern segment defining input signals to produce a visual pattern on said display including a visual representation of said pattern segments, said graphics generator providing first and second periodically varying output signals from first and second output registers with each successive pair of said output signals differing from a preceding pair by an amount producing a stroke of constant length on said display, said graphics generator comprising:

rotation control means responsive to one of said pattern segment defining signals to store a quantity representative of at least initial pattern segment orientation, first means with sine and cosine outputs, producing respectively, sine and cosine functions of an input, said first means coupled to said rotation control means and receiving said input therefrom, a first and second adder, each with a first input, said first input of said first adder connected to said sine output and said first input of said second adder connected to said cosine output, said first and second output registers responsive, respectively, to outputs of said first and second adders, second inputs of said first and second adders connected, respectively, to outputs of said first and second output registers, clocking means for periodically strobing each of said output registers to accept and store said first and second adder outputs, whereby quantities stored in respective output registers, periodically change in accordance with quantities provided to each respective adder by said first means.

2. The apparatus of claim 1 further comprising:

(a) means for enabling said clocking means responsive to another of said pattern segment defining signals, (b) length register means responsive to a further pattern segment defining signal for storing therein a pattern segment defining signal representing pattern segment length and enabled by said another pattern segment defining signal, (c) decrementing means responsive to said clocking means, when enabled, for decrementing said length register means and for disabling said clocking means when incremented to a predetermined state, whereby said first and second output registers produce output signals periodically varying from reception of said another of said pattern segment defining signals until disablement of said clocking means.

3. The apparatus of claim 2 wherein said at least one pattern segment comprises a conic section to be approximated by a series of strokes of varying orientation in which said pattern segment defining signals include a first signal representing conic circumferential length, a second signal representing radius of curvature and a third signal identifying said pattern segment as a conic, said apparatus further including:

a direction register, adding means and rotation register in said rotation control means, with said rotation register coupled to an output of said adding means, inputs of said adding means coupled to said direction and rotation registers, means coupling said second signal to said direction register, means coupling said first signal to said length register means enabled by said third signal, control means responsive to said third signal and to said clocking means for producing a pulse stream at a rate related to said clocking means output, means responsive to said control means pulse stream for strobing said rotation register to store an output of said adder, whereby said periodically varying output signals represent said strokes whose orientation changes at a rate determined by said pulse stream rate and the quantity represented by said second signal.

4. The apparatus of claim 2 which includes means for generating periodically varying output signals to represent a pattern segment comprising one of a plurality of alpha numeric characters, said means including:

a character address counter responsive to a one of said pattern segment defining input signals, second means for enabling said clocking means responsive to a character defining input signal, a memory device addressed by said character address counter with an output, said memory device storing one or more character segment defining quantities for each of said plurality of characters, said memory device providing a character segment defining signal representative of a character segment defining quantity stored at a location of said memory device addressed by said character address counter, a character segment length register responsive to a portion of a character segment defining signal for storing therein a representation of said signal portion, means coupling another portion of a character segment defining signal to said rotation control means, character segment length register decrementing means for decrementing said character length register responsive to said clocking means, means to increment said character address counter when said character length counter is decremented to a predetermined state, and means coupled to said character length counter when in another predetermined state for disabling said clocking means, whereby said memory device produces a character segment defining signal for each of one or more character segments to produce periodically varying output signals from said graphics generator representative of a character defined in said memory device wherein each character segment is comprised of a plurality of said strokes.

5. The apparatus of claim 1 which includes apparatus for initializing said graphics generator, comprising:

first and second multiplexers each with two inputs and an output, first inputs of said multiplexers coupled respectively to outputs of said adders, for coupling outputs of first and second adders to said output registers when said clocking means is enabled, bus means, second inputs of said multiplexers coupled to said bus means, control means responsive to first and second initializing control signals for allowing an associated second multiplexer input to be effective, whereby application of either a first or second initializing signal on said bus means in time coincidence with first or second initializing control signals is effective to initialize first or second output registers, respectively.

6. The apparatus of claim 1 wherein said first means comprises a digital memory device with a single addressing input and sine and cosine outputs, said memory device providing at a sine output a digital representation of 1 sin 0 and at a cosine output a digital representation of 1 cos 0 in response to an addressing input representing 0.

7. A graphics generator for producing periodically changing pairs of digital output signals, changes in said pairs of output signals in each period representing a unit length stroke when displayed to provide for constant writing speed CRT display when said pair of output signals are employed as deflection signals comprising:

an input data bus, a pair of output registers for supplying said output signals and selectively coupled to said bus for initializing said output registers, a length register selectively responsive to said bus for initializing said length register, a pair of adders, each with two inputs and an output, an input of each said adder coupled to a different one of said output registers, said adders outputs coupled to a corresponding one of said output registers, incrementing means coupled to another input of each said adder, said incrementing means including a means for storing a quantity representative of desired orientation for said unit length stroke, and further including means for deriving sine and cosine functions of said quantity, and clocking means for periodically strobing adder outputs into said output registers and for decrementing said length register.

8. The apparatus of claim 7 wherein said incrementing mean includes:

a memory device storing sine and cosine functions for a plurality of angular valves of orientation, and at least one register provides an input to said memory device for addressing a particular sine and cosine function stored therein.

9. The apparatus of claim 7 in which said graphics generator produces digital output signals representing a straight line starting at $X_O Y_L$ of length L and orientation 0 which further includes, means responsive to first and second control signals for coupling one and another of said output register to said bus to store in said registers quantities representing $X_O$ and $Y_O$, respectively.

an orientation register in said incrementing means, means reponsive to a third control signal for storing a quantity representative of 0 on said data bus in said orientation register, means responsive to a fourth control signal for coupling said length register to said data bus for storing a quantity representative of L and for enabling said clocking means, said incrementing means further including a memory device addressed by said orientation register and storing sine and cosine functions, said memory device coupling said sine and cosine functions respectively to said adders.

means for decrementing said length register responsive to said clocking means, and means for disabling said clocking means when said length register is decremented to a predetermined state.

10. The apparatus of claim 7 in which said graphic generator produces digital output signals representing a conic starting at $X_O$, $Y_O$ of circumferential length L and radius of curvature r which further includes:

means responsive to first and second control signals for coupling one and another of said output registers tc said bus to store quantities representing $X_O$ and $Y_O$, respectively, a direction register, rotation register and rotation adder in said incrementing means, said direction register coupled to said input bus, said rotation adder having an input coupled to both direction and rotation registers and an output coupled to an input of said rotation register, means responsive to a third control signal for storing a quantity representing r in said direction register, means responsive to a fourth control signal for coupling said length register to said data bus to store a quantity representative of L and for enabling said clocking means, means responsive to said clocking means for enabling said rotation register to periodically store a quantity provided by said rotation adder, said incrementing means further including a memory device addressed by said rotation adder output and storing sine and cosine functions, said memory device coupling said sine and cosine functions respectively to said adders.

means responsive to said clocking means for decrementing said length register, and means for disabling said clocking means when said length register is decremented to a predetermined state.

11. The apparatus of claim 7 in which said graphic generator produces digital output signals representing an alpha numeric character which further includes:

an alpha numeric character definition memory and an addressing counter, selectively responsive to said bus, for addressing said character definition memory, a character segment length counter responsive to said character definition memory for storing a quantity representative of length of a character segment, means coupling said character definition memory to said incrementing means for storing a quantity representative of character segment orientation, means coupling said clocking means to decrement said character segment length counter and for incrementing said addressing counter when said character segment length counter has been decremented to a predetermined state, and decoding means responsive to another predetermined state of said character segment length counter for disabling said clocking means.

12. The apparatus of claim 11 which further includes:

means responsive to a first control signal for coupling said addressing counter to said bus and for coupling said clocking means to said character segment length counter.

13. The apparatus of claim 12 in which said character can be displayed at any selected orientation in which said incrementing means includes, a direction register, a rotation register and a rotation adder connected to sum outputs of said rotation register and said direction register, with said rotation adder output coupled to said means for deriving sine and cosine functions, said character definition memory coupled to said direction register of said incrementing means, said direction register selectively coupled to said bus.

means responsive to a second control signal for coupling said direction register to said bus, and further means responsive to a third control signal to couple said rotation register to said direction register through said adder to store in said rotation register a quantity from said direction register, whereby said character is displayed at an orientation determined by said quantity stored in said rotation register.

14. A graphics generator for driving a CRT display with constant writing speed from a pair of output registers which supply signals changing periodically to represent a vector, conic or alpha numeric character comprising:

mode selection control means responsive to predetermined control signals for operating in vector, conic or alpha numeric modes, a data bus, a pair of adders coupled to corresponding output registers to store adder output when said output registers are clocked, each adder having an input connected to a corresponding output register, each adder having a further input, incrementing means connected to said further input of each adder, said incrementing means supplying a digital output representing sine or cosine functions of a variable to a different further input of said adders, a rotation register and a direction register, said direction register selectively coupled to said data bus under control of said mode selection control means, a rotation adder included in said incrementing means supplying said variable, said adder having inputs connected respectively to said rotation register and said direction register, a length counter for storing a quantity representative of pattern length, a multiplexer selectively connecting said output registers to said data bus or to said pair of adders under control of said mode selection control means, a character address counter selectively connected to said data bus under control of said mode selection control means, a character segment length counter, a character definition memory addressed by said character address counter and providing outputs to said character segment length counter and to said direction register, and clocking means for clocking said output registers and for selectively decrementing said length counter or said character segment length counter under control of said mode selection control means, and disabling means for disabling said clocking means when either said length counter or said character segment length counter are in predetermined states.

15. The apparatus of claim 14 in which said incrementing means includes a memory device addressed by said rotation adder storing sine and cosine functions.

16. The apparatus of claim 14 in which said rotation register is selectively coupled to said rotation adder to store said adder output under control of said mode selection control means and said mode selection control means periodically couples said adder output to said rotation register during conic mode operations.

17. The apparatus of claim 14 in which said character definition memory stores plural words for each of several characters, each word defining length and orientation for each of plural character segments.

means for incrementing said character address counter under control of said mode selection control means when said character segment length counter is decremented to a predetermined state.

* * * * *